US012786622B2

(12) United States Patent
Sonobe et al.

(10) Patent No.: US 12,786,622 B2
(45) Date of Patent: Nov. 3, 2026

(54) SOUND SYSTEM

(71) Applicant: ALPS ALPINE CO., LTD., Tokyo (JP)

(72) Inventors: Takeru Sonobe, Fukushima (JP); Hiroyuki Taguchi, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 180 days.

(21) Appl. No.: 18/763,306

(22) Filed: Jul. 3, 2024

(65) Prior Publication Data

US 2025/0016500 A1 Jan. 9, 2025

(30) Foreign Application Priority Data

Jul. 7, 2023 (JP) ................................ 2023-112116

(51) Int. Cl.

*H03G 3/20* (2006.01)
*B60Q 9/00* (2006.01)
*B60R 11/02* (2006.01)
*H04R 1/02* (2006.01)
*H04R 3/00* (2006.01)
*H04R 29/00* (2006.01)
*B60R 11/00* (2006.01)

(52) U.S. Cl.

CPC ................ *H04R 3/00* (2013.01); *B60Q 9/00* (2013.01); *B60R 11/0217* (2013.01); *H04R 1/025* (2013.01); *H04R 29/001* (2013.01); *B60R 2011/0017* (2013.01); *B60R 2011/0043* (2013.01); *H04R 2430/01* (2013.01); *H04R 2499/13* (2013.01)

(58) Field of Classification Search

CPC ........ H04R 3/00; H04R 1/025; H04R 29/001; H04R 2430/01; H04R 2499/13; B60Q 9/00; B60R 11/0217; B60R 2011/0017; B60R 2011/0043

USPC ..................................................... 381/57, 56

See application file for complete search history.

(56) References Cited

U.S. PATENT DOCUMENTS

2010/0158263 A1* 6/2010 Katzer .............. G10K 11/1752 381/73.1

FOREIGN PATENT DOCUMENTS

JP 2001-095646 4/2001

* cited by examiner

*Primary Examiner* — Ammar T Hamid
(74) *Attorney, Agent, or Firm* — IPUSA, PLLC

(57) ABSTRACT

A "sound system" is provided for outputting a notification sound easy for a specific user to hear within a range in which other users are not bothered. A notification sound output from a notification sound source is output to a driver via a loudspeaker situated on headrest of the driver's seat after gain adjustment by a variable gain amplifier. Gain setter estimates power of noise at each seat based on noise collected by microphone, calculates gain for notification sound that makes notification sound larger than noise at the driver's seat and makes notification sound smaller than noise at a specific seat by using a first transfer function of notification sound from loudspeaker to the user on the driver's seat and a second transfer function of notification sound from loudspeaker to the user on the specific seat, which are previously determined, and sets the gain in the variable gain amplifier.

9 Claims, 4 Drawing Sheets

SOUND SYSTEM

CROSS-REFERENCE TO RELATED APPLICATION

The present application claims priority under 35 U.S.C. § 119 to Japanese Patent Application No. 2023-112116, filed Jul. 7, 2023, the contents of which are incorporated herein by reference in their entireties.

BACKGROUND OF THE INVENTION

Field of the Invention

The present invention relates to a technique for outputting a sound to a specific user without bothering other users.

Description of the Related Art

As a technique for outputting a sound to a specific user without bothering other users, there is known a technique of providing a loudspeaker on a headrest of a seat of an automobile and outputting a sound from the loudspeaker to a user seated on the seat (For example, Japanese Patent Application Laid-Open Publication No. 2001-95646).

SUMMARY OF THE INVENTION

Even in the case of outputting a sound from a loudspeaker provided on a headrest of a seat of an automobile to a user seated on the seat, when the volume is high, the sound output from the loudspeaker can be heard by other users, bothering them. On the other hand, when the volume is reduced to a level at which it is always guaranteed that other users cannot hear the sound, the sound output from the loudspeaker becomes difficult even for the user seated on the seat to hear.

Therefore, it is an object of the present disclosure to output a sound, which is easy for a specific user to hear, to the specific user within a range in which other users are not bothered.

To achieve the above object, the present disclosure provides a sound system for outputting, as a notification sound, a sound that is output from a sound source to a user seated on a first seat among a plurality of seats situated in an interior, wherein the sound system includes:

- a loudspeaker situated at a position closest to the user seated on the first seat among users seated on the seats;
- a gain adjuster configured to adjust a level of the sound output from the sound source at a gain that is set and output the sound as the notification sound to the loudspeaker;
- a processor configured to set the gain in the gain adjuster in accordance with a program readably stored in a memory, wherein a first transfer function that is a transfer function of the notification sound from the loudspeaker to the user seated on the first seat, and a second transfer function that is a transfer function of the notification sound from the loudspeaker to a user seated on a second seat different from the first seat among the plurality of seats are previously set in the processor; and
- a microphone configured to collect noise in the interior.

Here, the processor estimates a magnitude of noise at each seat based on the noise collected by the microphone, calculates the gain for the notification sound that makes the notification sound larger than the noise at a position of the user seated on the first seat and makes the notification sound smaller than the noise at a position of the user seated on the second seat based on the magnitude of the noise estimated, and the first transfer function and the second transfer function, and sets the gain in the gain adjuster.

Here, in the sound system, the processor may calculate the gain to be set in the gain adjuster so as to satisfy $$A = \alpha(P_N/P_X)$$

$$1 < \alpha < C_d/C_t$$

where $P_N$ represents an estimated power of the noise at each seat, $P_X$ represents a power of a signal obtained by convolving the first transfer function in the sound output from the sound source, $C_d$ represents the first transfer function, $C_t$ represents the second transfer function, and A represents the gain to be set in the gain adjuster.

In the sound system described above, the interior may be the interior of an automobile. Further, in order to achieve the object, the present disclosure provides a sound system for outputting, as a notification sound, a sound that is output from a sound source to a user seated on a first seat among a plurality of seats situated in an interior of an automobile, wherein the sound system includes:

- a loudspeaker situated at a position closest to a user seated on the first seat among users seated on the seats;
- a gain adjuster configured to adjust a level of the sound output from the sound source at a gain that is set and output the sound as the notification sound to the loudspeaker;
- a processor configured to set the gain in the gain adjuster in accordance with a program readably stored in a memory, wherein a first transfer function that is a transfer function of the notification sound from the loudspeaker to the user seated on the first seat, and a second transfer function that is a transfer function of the notification sound from the loudspeaker to a user seated on a second seat that is different from the first seat among the plurality of seats are previously set in the processor; and
- a microphone configured to collect noise in the interior of the automobile.

Here, the processor estimates a magnitude of noise at each seat based on the noise collected by the microphone, and calculates the gain to be set in the gain adjuster so as to satisfy to an extent possible $$-0.41P_N + 34.71 < P_{XA}/P_N < -0.71P_N + 57.03, \text{ and}$$

$$P_{TA}/P_N < -0.41\,P_N + 34.71$$

where $P_N$ represents an estimated power of the noise at each seat, $P_{XA}$ represents a power of a signal obtained by convolving the first transfer function in a signal obtained by the gain adjuster adjusting the level of the sound output from the sound source at the gain that is set, and $P_{TA}$ represents a power of a signal obtained by convolving the second transfer function in a signal obtained by the gain adjuster adjusting the level of the sound output from the sound source at the gain that is set.

Here, in a sound system in which the above-mentioned interior is the interior of an automobile, the first seat may be a driver's seat of the automobile.

In this case, it is preferable that the loudspeaker is provided on a headrest of the driver's seat.

In this case, a transfer function of the notification sound from the loudspeaker to a user seated on the second seat has a maximum gain among transfer functions of the notification sound from the loudspeaker to users seated on the seats of the automobile other than the driver's seat, or the second seat may be a seat selected by a user from among the seats of the automobile other than the driver's seat.

The sound system described above can output the notification sound such that a user of the first seat can hear the notification sound at a level at which the notification sound is not muffled by noise, while a user of the second seat cannot hear the notification sound clearly due to the notification sound being masked by noise.

As described above, according to the present disclosure, it is possible to output a sound, which is easy for a specific user to hear, to the specific user within a range in which other users are not bothered.

DETAILED DESCRIPTION OF THE DISCLOSURE

Embodiments of the present disclosure will be described below.

Figure 1:
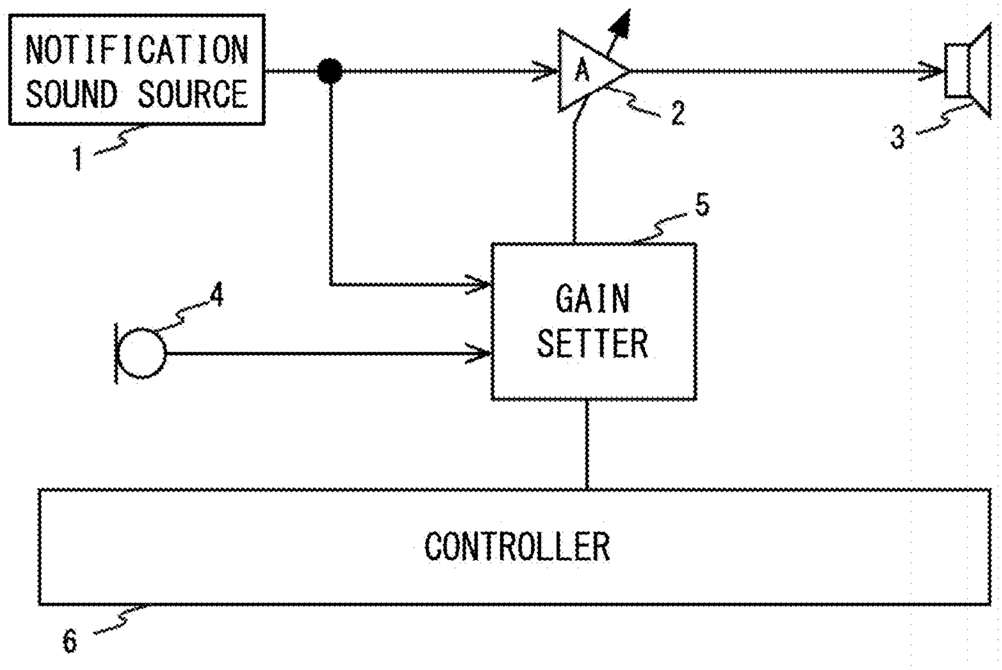
FIG. 1 is a block diagram illustrating a configuration of a sound system according to an embodiment of the present disclosure.

FIG. 1 illustrates a configuration of a sound system according to the present embodiment.

The sound system is a system mounted on an automobile, and includes, as illustrated, a notification sound source 1 configured to output a notification sound, a variable gain amplifier 2 having a variable gain A, a loudspeaker 3, a microphone 4, and a controller 6. The controller 6 is realized by a processor such as a Central Processing Unit (CPU) or the like operating in accordance with a program readably stored in a memory, and is configured to control each of the members. Examples of the functional configuration realized by the controller 6 includes a gain setter 5.

The notification sound output by the notification sound source 1 is, for example, a sound representing driving information for a driver, such as a car navigation message sound or a warning sound.

The notification sound output by the notification sound source 1 is output via the loudspeaker 3 with its power adjusted by the variable gain amplifier 2. The gain A of the variable gain amplifier 2 is set by the gain setter 5.

Figure 2A:
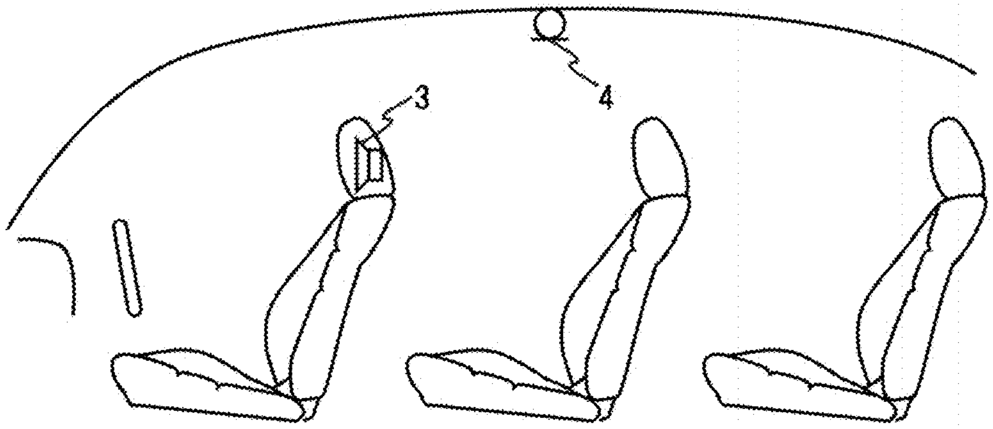
FIG. 2A is a view illustrating the positioning of a microphone and a loudspeaker in a sound system according to an embodiment of the present disclosure.
Figure 2B:
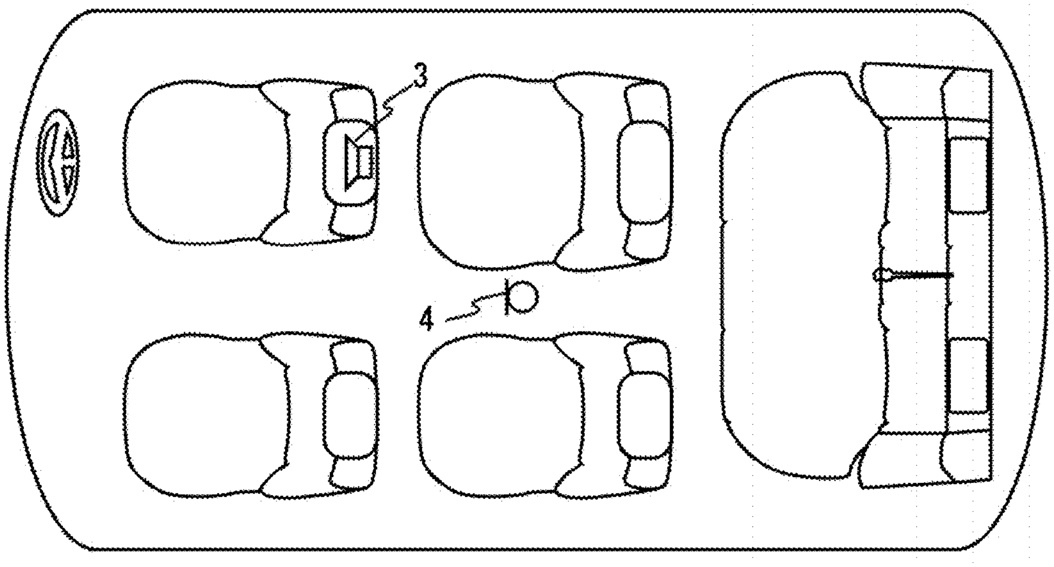
FIG. 2B is a view illustrating the positioning of a microphone and a loudspeaker in a sound system according to an embodiment of the present disclosure.

Next, as illustrated in FIGS. 2A and 2B, the loudspeaker 3 is situated on the headrest of the driver's seat so as to output a notification sound to the driver seated on the driver's seat.

The microphone 4 is configured to collect noise in the automobile such as engine noise and road noise. The microphone 4 can be situated, for example, on the ceiling at a position in the center of the automobile.

The setting of the gain A in the variable gain amplifier 2 performed by the gain setter 5 will be described below.

A target frequency-range transfer function of the notification sound from the loudspeaker 3 to the user seated on each seat is used for the setting.

The target frequency range is the frequency range of the notification sound, and is, for example, from 100 Hz through 1 kHz, which is the frequency range of the human voice.

Figure 3:
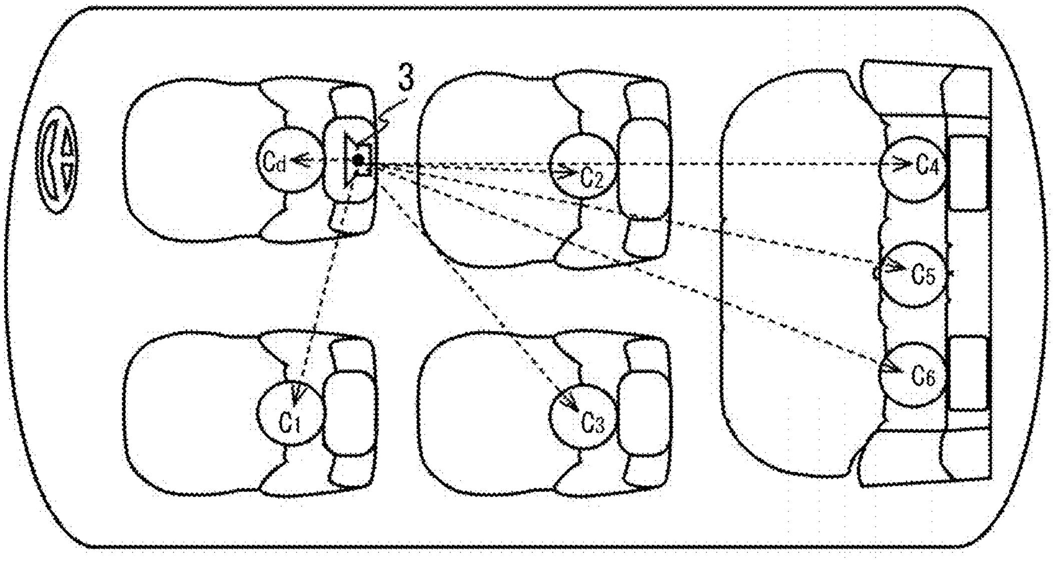
FIG. 3 is a view illustrating transfer functions studied in relation to a sound system according to an embodiment of the present disclosure.

In the following, as illustrated in FIG. 3, the target frequency-range transfer function from the loudspeaker 3 situated on the headrest of the driver's seat to the user (driver) seated on the driver's seat is represented by $C_d$, and the target frequency-range transfer functions from the loudspeaker 3 to the users seated on the respective seats other than the driver's seat are represented by $C_i$ ($C_1$ to $C_6$ in the drawing) where i represents the seat number of each seat other than the driver's seat. Since the loudspeaker 3 is situated on the headrest of the driver's seat, the gain of the transfer function $C_d$ to the driver's seat is significantly larger than the gain of the transfer functions $C_i$ to the other seats.

Returning to FIG. 1, the transfer function $C_d$ and the transfer functions $C_i$ to the users seated on the respective seats are previously determined by actual measurement or the like for each automobile model or the like, and stored in the controller 6.

The controller 6 sets the transfer function $C_d$ to the driver's seat in the gain setter 5, and sets the transfer function corresponding to a specific seat among the seats other than the driver's seat in the gain setter 5 as the target transfer function $C_t$.

Hereinafter, for the sake of expediency, the seat corresponding to the target transfer function $C_t$ set in the gain setter 5 will be described by referring to it as the "target seat".

As the target transfer function $C_t$, the transfer function having the largest gain among the transfer functions $C_i$ is set, or the transfer function corresponding to a seat (e.g., a VIP seat) that is set as the target seat by the user from among the seats other than the driver's seat is set.

Here, as the target transfer function $C_t$, the transfer function having the largest gain among the transfer functions $C_i$ may be set fixedly. In this case, only the transfer function $C_d$ to the driver's seat and the transfer function set as the target transfer function $C_t$ among the transfer functions $C_i$ may be stored in the controller 6. Alternatively, instead of storing the transfer function $C_d$ to the driver's seat and the transfer functions $C_i$ in the controller 6, the transfer function $C_d$ to the driver's seat and the transfer function set as the target transfer function $C_t$ may be previously set in the gain setter 5.

The gain setter 5, in which the transfer function $C_d$ to the driver's seat and the target transfer function $C_t$ are set, calculates the target frequency-range power $P_N$ of noise in the automobile that is collected by the microphone 4. Since the level of the noise in the automobile, which includes engine noise and road noise, is uniformly the same level in the automobile, the power $P_N$ calculated from the noise collected by the microphone 4 can be used as an indicator of the power of noise at each seat in the automobile.

Then, the gain setter 5 calculates the gain A by the following formula based on the power $P_N$ of the noise, the notification sound that is input from the notification sound source 1, and the transfer function $C_d$ to the driver's seat and the target transfer function $C_t$ that are set, and sets the gain A in the variable gain amplifier 2.

$$A = \alpha(P_N/P_X)$$

$$1 < \alpha < C_d/C_t$$

Here, $P_X$ represents the power of a signal obtained by convolving the transfer function $C_d$ to the driver's seat in the notification sound (not gain-adjusted) that is input from the notification sound source 1.

Here, when $\alpha=1$, $A=\alpha(P_N/P_X)$ becomes $A=P_N/P_X$, and the power $A \cdot P_X$ of the notification sound to be transmitted to the user on the driver's seat is calculated as follows.

$$A \cdot P_X = (P_N/P_X) \cdot P_X = P_N.$$

Thus, the SNR of the notification sound to the noise at the driver's seat is 0 dB.

On the other hand, when $\alpha=C_d/C_t$, $A=\alpha(P_N/P_X)$ becomes $A=(C_d/C_t)\cdot(P_N/P_X)$, and the power $C_t \cdot A \cdot (P_X/C_d)$ of the notification sound to be transmitted to the user on the target seat is calculated as follows.

$$C_t \cdot A \cdot (P_X/C_d) = C_t \cdot (C_d/C_t) \cdot (P_N/P_X) \cdot (P_X/C_d) = (C_t \cdot C_d \cdot P_N \cdot P_X)/(C_t \cdot P_X \cdot C_d) = P_N.$$

Thus, the SNR of the notification sound to the noise at the target seat is 0 dB.

Therefore, by calculating and setting the gain A so as to satisfy the condition that $1<\alpha<C_d/C_t$, it is possible to output the notification sound via the loudspeaker 3 by adjusting its volume such that the notification sound becomes larger than the noise at the driver's seat and the notification sound becomes smaller than the noise at the target seat.

Therefore, the user on the driver's seat can hear the notification sound without it being muffled by the noise, while the user on the target seat cannot hear the notification sound clearly because the notification sound is masked by the noise.

Here, the gain A may be set to the maximum value within the range in which the condition that $1<\alpha<C_d/C_t$ is satisfied. Alternatively, it may be set to become closest to a previously set standard gain within the range in which the condition that $1<\alpha<C_d/C_t$ is satisfied.

When the transfer function having the largest gain among the transfer functions $C_i$ is set as the target transfer function $C_t$, the largest notification sound is transmitted to the target seat among the seats other than the driver's seat. Thus, calculating and setting the gain A as described above results in the notification sound becoming smaller than the noise in all seats other than the driver's seat.

Alternatively, the gain A may be set as follows in the gain setter 5.

The ITU recommendation "Recommendation ITU-T P. 1150, In-car communication audio specification" indicates that the SNR between Upper y and Lower y expressed by the following equations is the SNR of a sound preferred with respect to a noise level x.

$$y = -0.71x + 57.03; \quad \text{Upper}$$

$$y = -0.41x + 34.71; \quad \text{Lower}$$

Therefore, when the SNR of the notification sound at the driver's seat is expressed as $P_{XA}/P_N$ where $P_{XA}$ represents the power of a signal obtained by convolving the transfer function $C_d$ to the driver's seat in a signal obtained by gain-adjusting the notification sound at the gain A, and the SNR of the notification sound at the target seat is expressed as $P_{TA}/P_N$ where $P_{TA}$ represents the power of a signal obtained by convolving the target transfer function $C_t$ in a signal obtained by gain-adjusting the notification sound at the gain A, the SNR of the notification sound at the driver's seat can become a value between Upper and Lower, and the user on the driver's seat can hear the notification sound at the preferable SNR, on the following condition.

$$-0.41P_N + 34.71 < P_{XA}/P_N < -0.71P_N + 57.03$$

On the other hand, the SNR of the notification sound at the target seat can become less than Lower, and the notification sound can be masked by the noise so as to not be heard clearly, on the following condition.

$$P_{TA}/P_N < -0.41\,P_N + 34.71$$

Therefore, the gain A is calculated and set to satisfy $-0.41P_N+34.71<P_{XA}/P_N<-0.71P_N+57.03$ and $P_{TA}/P_N<-0.41P_N+34.71$.

Figure 4:
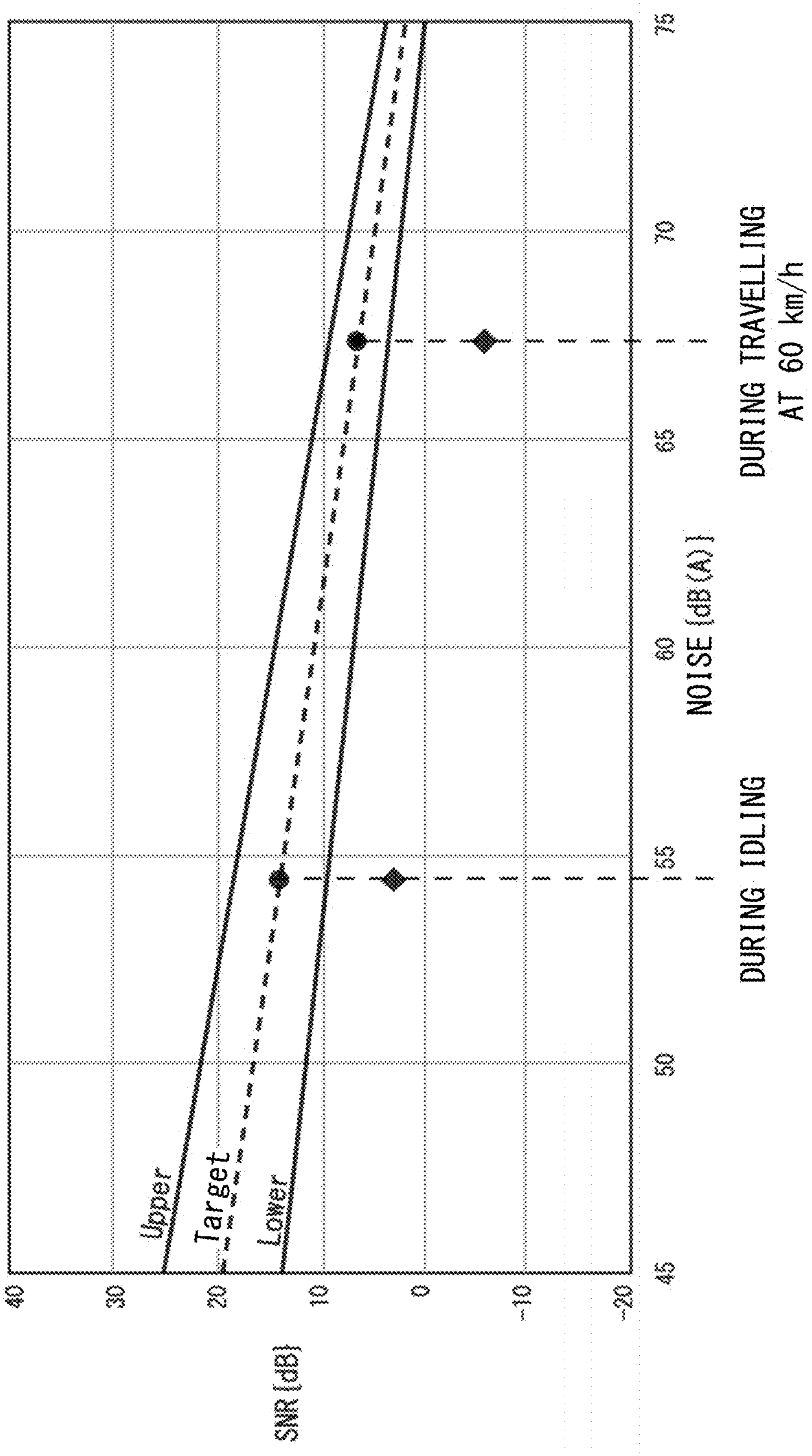
FIG. 4 is a graph illustrating an example of sound volume control of a sound system according to an embodiment of the present disclosure.

That is, for example, as illustrated in FIG. 4, where the medium value between Upper and Lower that are fixed with respect to the noise level is defined as Target, if the gain A calculated such that the SNR at the driver's seat becomes Target that is fixed with respect to the power $P_N$ of the noise satisfies $P_{TA}/P_N<-0.41P_N+34.71$, the gain A thus calculated such that the SNR at the driver's seat becomes Target is set in the variable gain amplifier 2.

The black circles in FIG. 4 represent the SNR at the driver's seat according to the gain A thus set, and the diamonds represent the SNR at the target seat according to this gain A. As illustrated in the graph, at each of different noise levels, like the noise level during idling and the noise level during travelling at 60 km, it is possible to enable the user on the driver's seat to hear the notification sound at the preferred SNR, while enabling the notification sound to not be heard clearly at the target seat by masking the notification sound with the noise.

On the other hand, when the gain A calculated such that the SNR at the driver's seat becomes Target does not satisfy $P_{TA}/P_N<-0.41P_N+34.71$, the maximum gain A that satisfies $-0.41P_N+34.71<P_{XA}/P_N$ and $P_{TA}/P_N-0.41P_N+34.71$ is calculated and set in the variable gain amplifier 2.

Further, when there is no gain A that satisfies $-0.41P_N+34.71<P_{XA}/P_N$ and $P_{TA}/P_N-0.41P_N+34.71$, a gain A that satisfies $-0.41P_N+34.71+M=P_{XA}/P_N$, where M is a predetermined margin, is calculated and set in the variable gain amplifier 2.

An embodiment of the present disclosure has been described above.

In the above embodiment, the loudspeaker 3 is situated on the headrest of the driver's seat. However, the loudspeaker 3 may be situated at any other position that is closest to the user seated on the driver's seat among users seated on the respective seats.

In addition, the above embodiment has been described for the case of performing control such that the user seated on the driver's seat can hear the notification sound and the users seated on the other seats cannot hear the notification sound clearly. However, in a case of performing control such that a user seated on a specific seat other than the driver's seat can hear the notification sound and users seated on seats other than the specific seat cannot hear the notification sound clearly, it is possible to apply the present disclosure similarly by substituting the specific seat in the place of the driver's seat in the above description.

Moreover, the above embodiment has been described regarding application to the interior of an automobile. However, the present embodiment may be applied to any interior in which a plurality of seats are situated fixedly, such that a user seated on a specific seat in the interior can hear the notification sound whereas users seated on other seats cannot hear the notification sound clearly.

What is claimed is:

1. A sound system for outputting, as a notification sound, a sound that is output from a sound source to a user seated on a first seat among a plurality of seats situated in an interior, the sound system comprising:

a loudspeaker situated at a position closest to the user seated on the first seat among users seated on the seats;

a gain adjuster configured to adjust a level of the sound output from the sound source at a gain that is set, and output the sound to the loudspeaker as the notification sound;

a processor configured to set the gain in the gain adjuster in accordance with a program readably stored in a memory, wherein a first transfer function that is a transfer function of the notification sound from the loudspeaker to the user seated on the first seat, and a second transfer function that is a transfer function of the notification sound from the loudspeaker to a user seated on a second seat different from the first seat among the plurality of seats are previously set in the processor; and a microphone configured to collect noise in the interior, wherein the processor estimates a magnitude of noise at each seat based on the noise collected by the microphone, calculates the gain for the notification sound that makes the notification sound larger than the noise at a position of the user seated on the first seat and makes the notification sound smaller than the noise at a position of the user seated on the second seat based on the magnitude of the noise estimated, and the first transfer function and the second transfer function, and sets the gain in the gain adjuster, wherein the processor calculates the gain to be set in the gain adjuster so as to satisfy $$A = \alpha(P_N/P_X)$$

$$1 < \alpha < C_d/C_t$$

where $P_N$ represents an estimated power of the noise at each seat, $P_X$ represents a power of a signal obtained by convolving the first transfer function in the sound output from the sound source, $C_d$ represents the first transfer function, $C_t$ represents the second transfer function, and A represents the gain to be set in the gain adjuster.

2. A sound system for outputting, as a notification sound, a sound that is output from a sound source to a user seated on a first seat among a plurality of seats situated in an interior of an automobile, the sound system comprising:

a loudspeaker situated at a position closest to the user seated on the first seat among users seated on the seats;

a gain adjuster configured to adjust a level of the sound output from the sound source at a gain that is set, and output the sound to the loudspeaker as the notification sound;

a processor configured to set the gain in the gain adjuster in accordance with a program readably stored in a memory, wherein a first transfer function that is a transfer function of the notification sound from the loudspeaker to the user seated on the first seat, and a second transfer function that is a transfer function of the notification sound from the loudspeaker to a user seated on a second seat that is different from the first seat among the plurality of seats are previously set in the processor; and a microphone configured to collect noise in the interior of the automobile, wherein the processor estimates a magnitude of noise at each seat based on the noise collected by the microphone, and calculates the gain to be set in the gain adjuster so as to satisfy to an extent possible $$-0.41P_N + 34.71 < P_{XA}/P_N < -0.71P_N + 57.03, \text{ and}$$

$$P_{TA}/P_N < -0.41\,P_N + 34.71$$

where $P_N$ represents an estimated power of the noise at each seat, $P_{XA}$ represents a power of a signal obtained by convolving the first transfer function in a signal obtained by the gain adjuster adjusting the level of the sound output from the sound source at the gain that is set, and $P_{TA}$ represents a power of a signal obtained by convolving the second transfer function in a signal obtained by the gain adjuster adjusting the level of the sound output from the sound source at the gain that is set.

3. The sound system according to claim 1, wherein the interior is an interior of an automobile.

4. The sound system according to claim 1, wherein the interior is an interior of an automobile.

5. The sound system according to claim 2, wherein the first seat is a driver's seat of the automobile.

6. The sound system according to claim 5, wherein the loudspeaker is provided on a headrest of the driver's seat.

7. The sound system according to claim 5, wherein a transfer function of the notification sound from the loudspeaker to a user seated on the second seat has a maximum gain among transfer functions of the notification sound from the loudspeaker to users seated on the seats of the automobile other than the driver's seat.

8. The sound system according to claim 5, wherein the second seat is a seat selected by a user from among the seats of the automobile other than the driver's seat.

9. A sound system for outputting, as a notification sound, a sound that is output from a sound source to a user seated on a first seat among a plurality of seats situated in an interior, the sound system comprising:

a loudspeaker situated at a position closest to the user seated on the first seat among users seated on the seats;

a gain adjuster configured to adjust a level of the sound output from the sound source at a gain that is set, and output the sound to the loudspeaker as the notification sound;

a processor configured to set the gain in the gain adjuster in accordance with a program readably stored in a memory, wherein a first transfer function that is a transfer function of the notification sound from the loudspeaker to the user seated on the first seat, and a second transfer function that is a transfer function of the notification sound from the loudspeaker to a user seated on a second seat different from the first seat among the plurality of seats are previously set in the processor; and a microphone configured to collect noise in the interior, wherein the processor estimates a magnitude of noise at each seat based on the noise collected by the microphone, calculates the gain for the notification sound that makes the notification sound larger than the noise at a position of the user seated on the first seat and makes the notification sound smaller than the noise at a position of the user seated on the second seat so that the notification sound is masked by the noise, based on the magnitude of the noise estimated, and the first transfer function and the second transfer function, and sets the gain in the gain adjuster.

* * * * *